UNITED STATES PATENT OFFICE.

JOHN WALTER OSBORNE, OF WASHINGTON, DISTRICT OF COLUMBIA, ASSIGNOR, BY MESNE ASSIGNMENTS, TO THE AMERICAN PHOTOLITHOGRAPHIC COMPANY, OF NEW YORK CITY.

IMPROVEMENT IN PHOTOLITHOGRAPHY.

Specification forming part of Letters Patent No. 32,668, dated June 25, 1861; reissue No. 5,961, dated July 7, 1874; application filed May 16, 1874.

*To all whom it may concern:*

Be it known that I, JOHN WALTER OSBORNE, formerly of the city of Melbourne, in the county of Bourke and Colony of Victoria, Australia, but now residing in the city of Washington and District of Columbia, have invented or discovered certain new and useful Improvements in the Art of Photolithography; and I do hereby declare that the following is a full and exact description thereof.

The object of my invention is to produce by photographic means, upon plates or lithographic stones, designs or pictures from which impressions can be taken with printing-ink in usual well-known ways.

To accomplish this object I avail myself of the alterative action of light upon certain kinds of organic matter—such as albumen and gelatine—in the presence of bichromate of potash; also, of the strong affinity which organic matter thus altered has for greasy ink, and of its repulsion for water; also, of the capacity which unaltered gelatine has for absorbing water, which gelatinizes and swells it; also, of the fact that heat and moisture, conjointly, will affect the coagulation of albumen, thereby converting it into an insoluble substance possessing a film-like or membraneous structure, and adhesiveness under pressure; and I also employ certain general principles and particular manipulations well known to photographers, lithographers, and printers in the copying, transferring, and treatment of the work. My invention consists in certain novel improvements in the art, method, or process to which they relate. The subject-matter claimed is hereinafter specifically designated.

To enable others skilled in the art of photolithography to make use of my invention, I will proceed to describe how the process may be performed.

I first make a solution of the following ingredients, in about the proportions given, which are those I prefer to employ, viz: Albumen, two ounces; gelatine, eight hundred grains; bichromate of potash, four hundred and forty grains; water, eight ounces.

The gelatine and the bichromate (the latter, by preference, being in a state of fine powder,) may be soaked in the whole quantity of water for three or four hours in the dark, and may then be melted by immersing the flask containing the mixture in hot water, taking care not to raise the heat higher than necessary. When the temperature of the melted mixture is about 110° Fahrenheit, the albumen is added and well mixed, and the whole allowed to repose for a time. The albumen should be obtained from fresh eggs, whipped to a froth, allowed to subside, and the quantity required then be measured off. I then take a sheet of plain positive photographic paper, dampen it, and, when it has become quite flat, cover it on one side with the solution above mentioned.

To apply this solution to the surface of the paper, the following or any more convenient method may be adopted: Lay the paper, face down, on a board, near one end of which is adjusted a trough, containing the mixture before mentioned, cooled to the temperature of 85° Fahrenheit. The side of the trough nearest the paper should be rounded to prevent undue friction. The trough should be provided with a movable piece of wood, passed longitudinally through it, with a rounded edge, under which the paper is drawn, which piece of wood should be so adjusted as just to press the under surface of the paper into the bichromate mixture as the paper is drawn under the rounded edge of the same upward from the trough.

The bichromate solution or mixture hereinbefore described may be varied as to quantities, or by the substitution or addition of other ingredients, such as chromic acid, or any other chromate or bichromate, or any of the salts of uranium or other chemicals of similar properties, so far as such can be used without impairing the advantages arising from a preponderance of albumen, or interfering with the characteristic property possessed by gelatine—of swelling in cold water.

The photolithographic transfer-paper, the manufacture of which has been described, may also, with equally good results, be prepared by coating the plain paper with two solutions, the first to consist of one part albumen, with from one to two parts water, which, after the paper has dried, is to be followed by another consisting of water, eight ounces; gelatine, six hundred and forty grains; bichromate of potash, three hundred and fifty-two grains.

In whichever of the ways above described the photolithographic transfer paper is made, it should be dried in a perfectly dark and warm room, and then passed through a lithographic press upon a copper plate, in order to glaze and flatten it.

A negative of the object to be photolithographed is now to be taken, and the sheet of paper, prepared as above, to be exposed under it, in a photographic pressure-frame used for making positives in sunlight, from one-half minute to six minutes, or more, if necessary.

This photographic positive-print is next to be inked in by passing it in its dry condition through a lithographic press, with its face toward a lithographic stone or plate, said stone or plate having been first evenly rolled in with lithographic transfer-ink. When the paper is pulled off the stone the greasy ink should be found to be of such a thickness as to disclose the positive-print dimly through it.

The next operation is an important part of my invention. Its object is to effect the coagulation of the albumen combined with the sensitive coating. With this in view, the inked print should now be taken into a darkened room and placed (swimming) on boiling water contained in a tray or dish—the inked side upward, excluding air-bubbles—where it should be left until the water is cold. A distinctive feature of my process is, availing myself of the swelling properties of gelatine, which change is brought about in the sensitive coating simultaneously with that of the coagulation of the albumen while the paper is swimming upon the water. The effect of these swelling properties of unaltered gelatine is to cause the altered portions of the gelatine, which do not swell, to become relatively depressed, whereby the ink upon said depressed parts is protected during the washing-off process, which is done as follows:

The print is to be placed, face upward, upon a smooth board, and washed off gently with a clean soft sponge dipped in water. When the print is clean enough, pin it fast to the board; pour a large quantity of boiling water over it from a kettle or other vessel. Now remove it from the board and lay the print, face up, on the boiling water, and let it float until the upper surface is dry, which soon takes place if the print be surrounded with an inky border. When the albumenized surface is dry, lift the paper off the water, lay it on blotting-paper, and then finish drying in any convenient manner.

This transfer-sheet may now be transferred to a lithographic stone in the ordinary way, or to the surface of a zinc plate, for zincographic printing; or to a copper plate, to be used as a guide for engraving on copper; or to any surface of wood, metal, stone, paper or cloth, glass, india-rubber, leather, or gutta-percha.

My process or method differs materially from that described in Newton's or Cutting & Bradford's patent. By Newton's process the photographic picture is thrown upon a lithographic stone or zinc plate prepared for the purpose by a direct exposure under a positive, or in the camera, and the ink adheres eventually to those parts of said prepared surface where the light has not acted; whereas I do not work upon the stone or zinc direct, but upon a prepared surface upon paper, whereby a positive transfer is made, upon which the ink will be found adherent to those places where the light has acted. By Newton's process it will be found difficult, if not impossible, to produce the clearness and sharpness requisite for printing maps, line-engravings, drawings, and manuscripts.

Poitevin produces his photolithographs upon the stone direct; in this he differs from me, and also in his method of wetting the exposed surface of his sensitized paper for the production of a carbon print before inking it; whereas I, on the contrary, ink my transfer-sheet while dry.

Asser's process differs from mine in the nature of the basis over which the sensitized coating is applied. He uses plain paper, or paper sized with starch, while in my process the existence of a coating of albumen under the work prevents the greasy ink from spreading into the fiber or pores of the paper, which would injure the clearness of the lines. Asser also washes and wets his exposed transfer-sheet before inking it.

Colonel James's method, practiced in the British Ordnance Survey Office, also differs from mine, inasmuch as he uses gum in preparing his photolithographic transfer-paper; whereas I use a compound film of albumen and gelatine, each of these substances playing an important part. The albumen, in my process, while it is easily applied to the paper in its uncoagulated state, resists, after the change of coagulation has been effected in it by the action of the boiling water, every attempt to wash it away. This invention is also subsequent to mine. The work, therefore, is found eventually to be upon albumenized paper, which, besides improving its quality, plays a very important part, by constituting an underlying adhesive coating, which adheres firmly to the lithographic stone or other substance during the operation of transferring in the lithographic press, in consequence whereof the paper cannot slip, which would cause the work to become thickened or doubled. The compound film of albumen and gelatine, upon which I work, enables me also to derive great advantages from the manner in which those parts of it unacted upon by light swell up when floating the inked print upon the boiling water; this change in the exposed and inked surface causing the work to become considerably depressed, whereby the ink upon it is protected from the rubbing action of the sponge, and the maximum amount of firmness and clearness is the result. In this respect my process differs materially from Colonel James's, and all others.

From the foregoing references, it will be seen that I do not claim to be the original inventor of photolithography.

I am aware that the sensitized surfaces of lithographic stones and metal plates have been inked while dry, and do not, therefore, broadly claim the dry inking of any and every surface for photolithographic purposes; but I am not aware, and do not believe, that prior to the date of my invention a sheet of photolithographic transfer-paper was ever inked while dry with lithographic transfer-ink after the formation of a picture on the sensitized surface of said paper. I am likewise aware that ink has been applied to the whole sensitized surface of a lithographic stone after the same has been exposed to light for the production of a design thereon, and the superfluous portions of ink subsequently removed; but I am not aware, and do not believe, that prior to the date of my invention an exposed sheet of photolithographic transfer-paper has been uniformly inked with lithographic transfer-ink, and the excess (not required to form the design) subsequently removed in any way, or by any means whatsoever.

I am aware that prior to the date of my invention the swelling property of gelatine had been made available for the production of relief and intaglio plates; but I am not aware, and do not believe, that prior to the date of my invention the swelling and gelatinizing properties of gelatine were used to facilitate the removal from the sensitized surface of a sheet of photolithographic transfer-paper of superfluous ink thereon not needed to form the transferable picture.

I claim as my own invention—

1. The improvement in the art of preparing photolithographic transfer-paper herein set forth, which improvement consists in the application to the surface of a sheet of paper of a mixture of albumen, gelatine, and bichromate of potash, substantially as hereinbefore set forth.

2. The improvement in the art of inking photolithographic transfer-paper herein set forth, which improvement consists in inking with lithographic transfer-ink photolithographic transfer-paper which has been exposed to light for the production of a picture or design thereon, and while said transfer-paper is in a dry state, substantially as hereinbefore set forth.

3. The improvement in the art of inking photolithographic transfer-paper herein set forth, which improvement consists in inking with lithographic transfer-ink the entire coated surface of a sheet of photolithographic transfer-paper previously exposed to light for the production of a picture or design thereon, substantially as hereinbefore set forth.

4. The improvement in the art of photolithography herein set forth, which improvement consists in inking the coated surface of a sheet of photolithographic transfer-paper, (previously exposed to light for the production of a picture or design thereon,) and then removing therefrom the superfluous ink not needed to form the transferable picture, substantially as and for the purpose set forth.

5. The improvement in the art of removing ink from photolithographic transfer-paper herein set forth, which improvement consists in removing the superfluous ink (not needed to form the transferable picture) from the surface of a sheet of inked and exposed photolithographic transfer-paper by the conjoint action of friction and moisture, substantially as hereinbefore set forth.

6. The improvement in the art of preparing photolithographic transfer-paper herein set forth, which consists in providing the paper with a film of coagulated albumen, to prevent the smearing of the fibers of the paper by the greasy ink, substantially as set forth.

7. The improvement in the art of photolithography herein set forth, which consists in coagulating by heat and moisture the albumen in the coating of a sheet of photolithographic transfer-paper which has been exposed to light (to produce a picture or design thereon) and inked with lithographic transfer-ink, substantially as hereinbefore set forth.

8. The improvement in the art of photolithography herein set forth, which improvement consists in preparing a sheet of photolithographic transfer-paper by coating its surface with albumen, gelatine, and bichromate of potash; exposing it to light to produce a picture or design thereon; inking this sheet with lithographic transfer-ink; coagulating the albumen by heat and moisture to produce a homogeneous insoluble coating, covering the paper, and underlying the picture; and removing the superfluous ink (not needed to form the transferable picture) from those parts unaffected by light, substantially as hereinbefore set forth.

9. The improvement in the art of photolithography herein set forth, which consists in the application of moisture to the gelatine-coated surface of a sheet of photolithographic transfer-paper which has been exposed to light to produce a picture or design thereon, and then inked when dry, whereby the gelatine is gelatinized and swelled, so as to lessen the adhesion of those parts of the coating unaffected by light, and elevate them above the altered parts, thus facilitating the removal of the ink from the parts unaffected by light, substantially as hereinbefore set forth.

10. The improvement in the art of photolithography herein set forth, which consists in moistening, through the back of a sheet of photolithographic transfer-paper, a gelatine-coated inked picture, whereby the gelatine is gelatinized and swelled, so as to raise the parts of the coating unaltered by light above the altered parts, thus protecting them, while facilitating the removal of the ink from the unaltered parts without moistening the coating through the ink.

11. The improvement in the art of photolithography herein set forth, which consists in inking the albumen-coated surface of a sheet of photolithographic transfer-paper which has been exposed to light for the production of a picture or design thereon, coagulating the albumen, removing the ink from the parts unaffected by light, placing the inked sheet on a stone for transfer, and pulling the sheet through the press, whereby I am enabled to avail myself of the adhesiveness of the coagulated albumen to the stone to prevent the moving of the transfer-sheet thereon while the transfer is being made, substantially as hereinbefore set forth.

12. The improvement in the art of photolithography herein set forth, which consists in washing the coated surface of a sheet of photolithographic transfer-paper with hot water to remove soluble matter therefrom after the removal of the superfluous ink, substantially as hereinbefore set forth.

13. The improvement in the art of photolithography herein set forth, which consists in coating a sheet of paper with a mixture of albumen, gelatine, and bichromate of potash, exposing it to light to produce a picture or design thereon, inking the sheet with lithographic transfer-ink, and then moistening the sheet through the back in order to gelatinize and swell the gelatine unaffected by exposure to light, whereby those parts are raised above the altered portions of the picture, thus protecting the altered portions and facilitating the removal of the unaltered parts.

14. The improvement in the art of photolithography herein set forth, which consists in preparing photolithographic delineations from which impressions can be printed, after the manner of lithography, by coating a sheet of photolithographic transfer-paper with albumen, gelatine, and bichromate of potash, exposing it to light to produce a picture or design thereon, inking the whole surface of the coated sheet while dry, exposing the inked sheet to heat and moisture to coagulate the albumen and swell those parts of the gelatinized surface unaffected by light, removing the superfluous ink not needed to form the picture by the conjoint action of friction and moisture, and transferring the inky picture to the lithographic stone, substantially as hereinbefore set forth.

JOHN WALTER OSBORNE.

Witnesses:
WM. D. BALDWIN,
JOE I. PEYTON.